United States Patent [19]

Kusisto

[11] Patent Number: 4,555,911
[45] Date of Patent: Dec. 3, 1985

[54] VEHICLE AIR CONDITIONER GROUND WHEEL DRIVEN

[76] Inventor: Ike W. Kusisto, P. O. Box 5913, Prescott Valley, Ariz. 86312

[21] Appl. No.: 648,384

[22] Filed: Sep. 7, 1984

[51] Int. Cl.⁴ .............................................. B60H 3/04
[52] U.S. Cl. ...................................... 62/241; 62/425; 280/289 D; 416/55
[58] Field of Search ............ 98/1; 62/241, 242, 259.3, 62/425; 280/289 D, 289 R; 416/55

[56] References Cited

U.S. PATENT DOCUMENTS

| | | | |
|---|---|---|---|
| 418,933 | 1/1890 | Sommerville | 416/55 |
| 645,482 | 3/1900 | Mills | 416/55 |
| 681,565 | 8/1901 | McCune et al. | 416/55 |
| 803,635 | 11/1905 | Stahlhut | 280/289 D |
| 3,140,590 | 7/1964 | Gleockler | 62/425 |
| 4,177,650 | 12/1979 | Volk | 62/425 |

Primary Examiner—Ronald C. Capossela
Attorney, Agent, or Firm—Hiram A. Sturges

[57] ABSTRACT

An air conditioner system for bicycles and other vehicles, the system using a wheel of the vehicle as a source of power, air flow through an ice chamber being useable in the system as an optional further coolant.

7 Claims, 7 Drawing Figures

VEHICLE AIR CONDITIONER GROUND WHEEL DRIVEN

BACKGROUND OF THE INVENTION

Air conditioning has been available on the market for almost any kind of vehicle, except bicycles.

Fan systems have been proposed for bicycles, but for various reasons, have not been popular, often using dangerously exposed blades and gears.

It is, therefore, an object of this invention to provide an air conditioning system for bicycles in which the moving parts are all protected and housed and in which the flow of air is directed in a very concentrated manner, making use of the factor that the face of a cyclist is always centered directly above the plane of the wheels and with the maximum effect achieved by causing the cooling air to be directable at the cyclist's face, although the dispersion of the flow will cool other areas of the shoulders and chest to a substantial degree, also.

The importance of air conditioning a bicycle is not always readily understood because, while cycling, there is a breeze from the motion of the bicycle. However, cycling is often done under the hot sun and on sweltering days and always without the shade of a roof. Cyclists can become drowsy in the hot sun and the great danger of serious accidents from the drowsiness is very important.

The danger is particularly important when one considers that a cyclist is not protected, as is the passenger of an automobile.

For these reasons, a practical and effective bicycle air conditioner has been much needed.

A particular objective is to provide an effective way to hold an air conditioner system wheel firmly against the forward wheel of the bicycle to be driven thereby, the disconnection of the drive to the system being easily and quickly accomplished.

Heretofore the only fans proposed for use in bicycles have been of the radial-bladed type operating in the open air. An objective hereof is to provide an air blowing accomplished by blowers on a cylindrical periphery.

In U.S. Pat. No. 418,933, issued to C. W. Sommerville on Jan. 7, 1890, and titled Fan Attachment for Velocipedes or Other Vehicles, a single fan of the elongated radial-bladed type was used. A fan was disposed at a great height above the front wheel of the bicycle so as to fan a cyclist who is riding in a sitting-up position. A disadvantage is that the cyclist can pedal much more powerfully by bending forward into a position in which the flow of the air of the fan in this patent would pass over the cyclist's head and not cooling the cyclist. No adjustment is possible for the fan position because otherwise the belt would come out of position and would be slack.

In the U.S. Pat. No. 645,482 issued to J. A. Mills on Mar. 13, 1900 and titled Fan Attachment for Bicycles, a similar arrangement to the Sommerville patent was used with similar disadvantages. Both Mills and Sommerville patents had exposed belting which was in danger of catching wind-blown scarves or the like.

The U.S. Pat. No. 803,635 was issued to D. Stahlhut and titled Fan Attachment for Bicycles. In this patent the exposed fan of the elongated radial-blade type was down near the handle-bar and was exposed in a position where it would be in danger of being struck by the face of the cyclist in the event that the cycle hit an unseen obstruction and abruptly stopped.

In all of the above-mentioned patents, the exposed fan presented the danger of being struck by the operator's face.

U.S. Pat. No. 681,565 issued to O. B. McCune and C. Mull on Aug. 27, 1901 and titled Bicycle Fan was the first provision of a housed blower of a cylindrical periphery type. The gearing to drive the blower at a high speed was exposed and in danger of catching scarves and other wind-blown clothing. In this patent the drive was from the central sprocket of the bicycle involving long belting in a particularly dangerous position for catching and entangling an overcoat, or a skirt, or a pant's cuff. The blower in this patent had an outlet facing in only one linear direction and unadjustable to the positions of riders of different body length and of different preferred riding positions, such as bent-over or sitting-up.

The single large blower of U.S. Pat. No. 681,565 was necessarily bulky and disposed very close to the face of a cyclist who is bending over. Although a cyclist in this position can see most of the roadway that is of a substantial distance in front of the cycle, yet the position of the blower housing interferes to a degree with forward vision for a cyclist in the bent-over racing position because it is so close to his line of vision, if sometimes not in his line of vision.

It is, therefore, an object of this invention to provide not one blower large and bulky and in a high position spaced above the front wheel of the bicycle, but two smaller blowers having a combined air-blowing capability of the single large blower of proportionately larger size. In this way the two smaller blowers can have their uppermost ends farther downward to accommodate an air-flow directing housing portion thereabove and directing air-flow upwardly and rearwardly.

A further objective is to provide for the two smaller blowers to be disposed one on each side of the front wheel of the cycle so that the top of the housing containing the blowers can be at as low a level as possible so as to distract the least from the forward vision lines of the sight of a cyclist riding bent over in the racing position.

Yet another objective is to provide for the rearward end of the housing which channels the flow from the blowers to be provided with an air-directing adjustable control so as to direct the air higher for those who wish to ride in a higher position and a lower position for those who wish to cycle in the bent-over postion, such adjustment being quickly accomplished and changeable for the rider who wishes to alter his position from sitting more straight up to the bent-over racing or power cycling position in which the cyclist's body is streamlined for less wind-resistance.

U.S. Pat. No. 4,177,652 was issued to Lawrence C. Volk on Dec. 11, 1979, and titled Refrigeration System. This Volk patent shows the use of ice-cooling to cool food compartments of a catering truck. However, it has not caused anyone to conceive of the use of ice-cooling in the driver's area of any vehicle, nor is there ice-cooling in the Volk patent in the driver's compartment, nor has ice-cooling been proposed in bicycles.

The U.S. Pat. No. 3,140,590 to F. M. Gleockler issued July 14, 1964, and titled Air Conitioner for a Face Mask, shows cooling with a mask, but a cyclist or other vehicle driver wearing such as mask would be dangerously handicapped in his vision and such masks have not led anyone to conceive of ice-cooling of a cyclist.

SUMMARY OF THE INVENTION

An air conditioner for mounting above a ground wheel of a vehicle such as a bicycle and having blowers driven by a system wheel, the system wheel being disposed for engagement with a ground wheel, the blowers being received in a housing whereby their air is forced rearwardly, the housing having an upper portion removable from a lower portion, means for securing the two housing portions together releasably, the holding system comprising a pair of arms extending upwwardly from the axle of the forward wheel of the bicycle, a top-holding means section interconnecting the arms, a pressing means interconnecting the upper side of said housing and said connecting means and threadedly mounted on said connecting means and rotatably connected to said upper side of said housing in a manner such that when said pressing means is raised with respect to said connecting means then said housing will be lifted for raising said system wheel out of engagement with said bicycle wheel and whereby when said pressing means is lowered with respect to said connecting means said housing will be pressed downwardly for pressing said system wheel drivably against said bicycle wheel.

There being a chamber between said blowing means and an outlet at the rearward end of said housing, said chamber having an ice-insertion opening through said housing and also having an outflow port for water melted from ice said port being at one side of said housing so as not to drip on the bicycle wheel, and a clamp bracket assembly attachable to the handle-bar of said bicycle and attached to and supporting the rearward end of said housing.

BRIEF DESCRIPTION OF THE DRAWINGS

FIG. 3, being enlarged, shows certain details not brought out in FIG. 1, such as those portions of a system wheel forcing assembly which are disposed at the same level as the housing end above, and also the two-part nature of the housing which has a lower housing section which receives thereover an upper housing section, and a latching system for holding the upper housing section to the lower housing section. Certain duplicate parts on the right side of FIG. 3 do not appear for convenience of illustration, but are identical to parts on the left side of FIG. 3 because the right side would be a mirror image of the left side.

DESCRIPTION OF THE PREFERRED EMBODIMENTS

Figure 1:
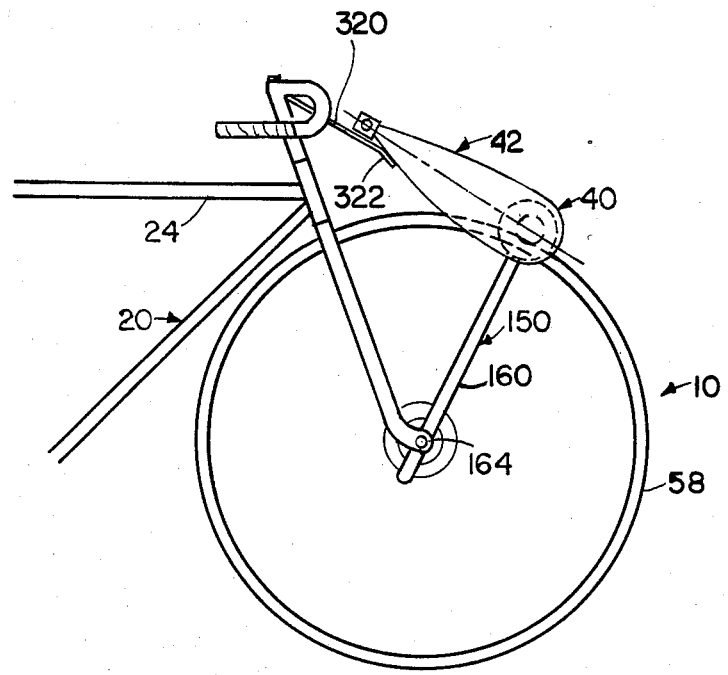
FIG. 1 is a side elevation of the forward portion of a bicycle showing the air conditioner of this invention mounted thereon and with the perimeter of a blower shown in dotted lines, and another line indicating the perimeter of a system wheel which engages the bicycle wheel.

FIG. 1 is a side elevation of an air conditioner and vehicle combination generally indicated at 10 in which the vehicle is specifically a bicycle 20 having a frame 24.

Figure 3:
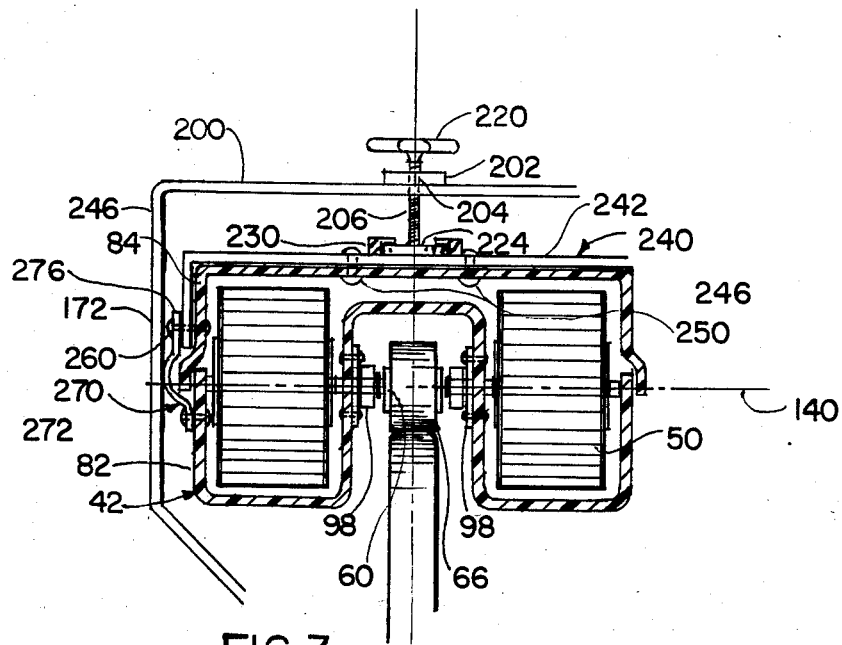
FIG. 3 is a view looking at the modification of FIG. 1 generally from its forward side, but actually, along the line 3—3 of FIG. 1.

The air conditioner hereof is generally indicated at 40 in FIG. 1 and has a housing 42 for receiving a pair of blowers 50, as best seen in FIG. 3.

The blowers 50 are disposed one on each side of the forward wheel 58 of the bicycle, the latter also being called a ground wheel of the vehicle, since the bicycle is broadly a vehicle.

Figure 2:
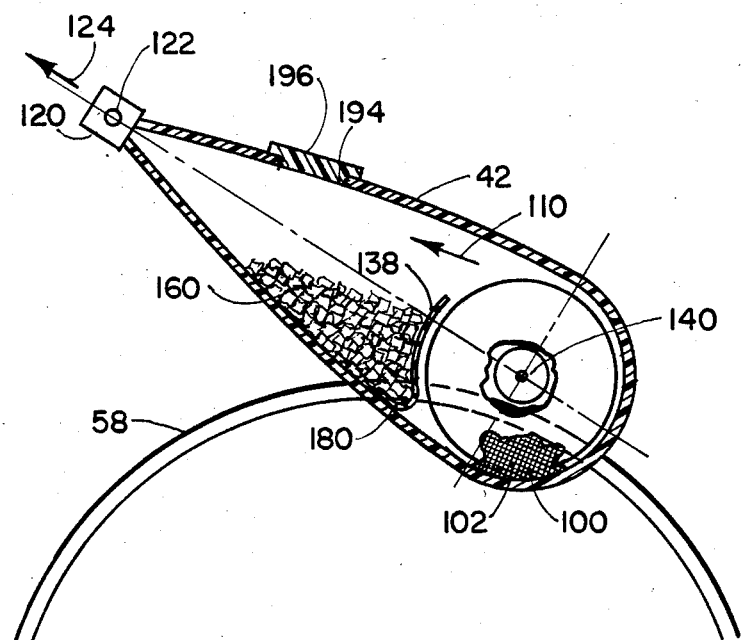
FIG. 2 is a side elevation of a modification of FIG. 1 which is identical to the modification of FIG. 1 in all respects with the exception of provision of an ice input opening and an ice-melt water outlet port. The closest wall of a cover of the air conditioner has been broken away in FIG. 2 to show the interior with the exception that a portion of the closest wall adjacent a lower portion of the end of the closest blower is shown in full lines to reveal that it is covered by a screen at an air intake port. A central portion of the closest blower is removed so as to reveal the system wheel therebehind.
Figure 4:
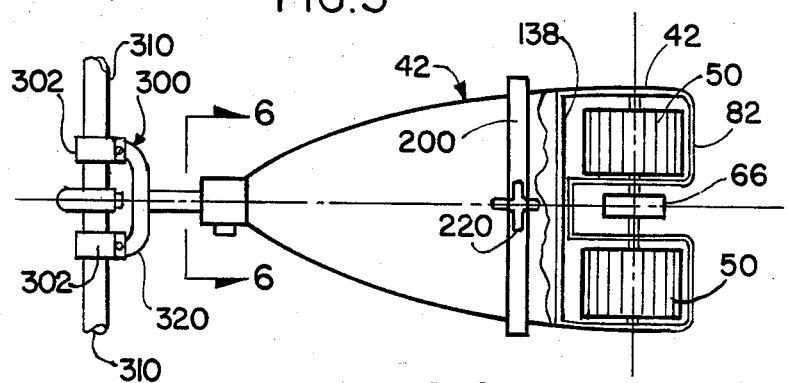
FIG. 4 is a top plan view of the air conditioner of FIG. 1 shown with only parts of the bicycle illustrated, such latter parts being those adjacent the center of the handlebar. A forward part of the upper housing is broken away to show the interior, and details, such as bearings, latches, and the upper and lower part nature of the housing, are not repeated in FIG. 4, as they are shown in FIG. 3.
Figure 6:
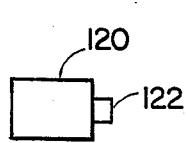
FIG. 6 is a view of the air outlet port housing with its wind deflection louvers controllable by a knob.

As best seen in FIGS. 2, 3 and 4, the blowers are each of a type having blades, the outer edges of which are disposed on a substantially cylindrical configuration.

The blowers 50 are both mounted on a single horizontal axle 60, which latter has a system wheel 66 attached to it midway between the blowers 50 and in engagement with the front wheel 58 of the bicycle.

The housing 42 has a lower section 82 which receives thereover an upper housing section 84.

The lower section 82 has a large upwardly extending recess 94 in its underside 82 and which receives the system wheel 66 and also a pair of bearings 98, which latter carry the axle 60 and which are fixed to the outer side of the lower section 82 of the housing to the right and to the left respectively of the system wheel 66.

As best seen in FIG. 2, air is admitted into the interior of the housing 42 at the right and left ends of the housing 42 and specifically through the lower section 82 of the housing through air intake ports 100 covered with screen 102. Although there is an air intake port on the left side of the housing for the left blower and one on the right side of the housing for the right blower, yet for convenience of illustration, since they are identical, only a single inlet port for air is shown, and that one is seen in FIG. 2.

The air coming in the ports 100 will be thrown rearwardly from the tops of the blowers in a direction of an arrow 110 in FIG. 2 toward an outlet port 120, which latter has an adjustable louver system on it which can be called a wind deflection system 124 having louvers or vanes 126, the angle of which is controlled by a knob 130 by the driver of the bicycle so as to direct the air from the outlet port 120 upwardly or downwardly as desired.

As best seen in FIG. 2, air is prevented from being thrown in undesirable directions by a wall 138, which latter extends from right to left of the housing 42 and extends from the bottom of the housing upwardly beyond the axis 140 of the axle 60 a substantial distance.

The wall 138 also has the advantage, when ice is used, as in FIG. 2, of retaining the ice 160 rearwardly thereof. The ice melts and water therefrom passes out an outlet port 180 at a side of the housing 42 out the bottom of the area immediately rearwardly of the wall 138.

The ice cubes 160' are inserted into the housing 42 through a threaded opening 194 in the upper side of the upper housing section 84 toward the rearward end thereof, the opening 194 threadedly receiving a cap 196, all as best seen in FIG. 2.

The housing must be pressed downwardly in order to hold the system wheel 66 against the bicycle wheel 58, and for that purpose, a system wheel forcing assembly is provided and is generally indicated at 150 and comprises a pair of arms disposed on the right and left sides of the wheel 58 and suitably connected to the axle 164 of the wheel 58 in a manner such that the arms 160 are firmly held from upward movement with respect to the axle 164.

Figure 5:
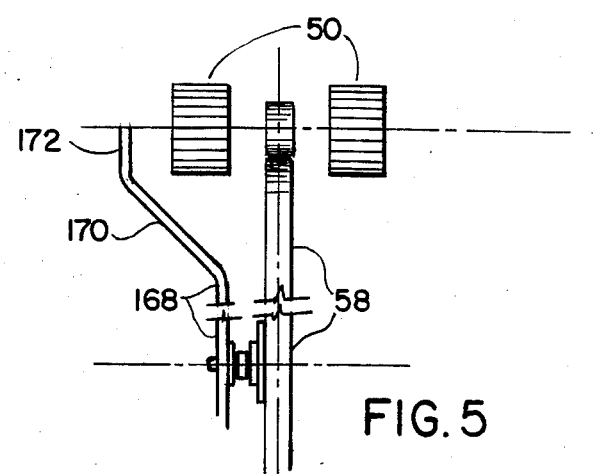
FIG. 5 is a diagrammatic view showing only blowers, system wheel upper part of a bicycle wheel, portions of arms of the forcing assembly, and only sufficient of the left side of the bicycle at its forward axle to show that the lower ends of the arms are attached to the axle.

The upper ends of the arms 160 can be seen in FIG. 5 to incline from vertical lower portions 168 through outwardly inclining portions 170 to vertical side portions 172 which can be seen in FIG. 3 to extend upwardly alongside of the housing 42, being joined together by a horizontal upper transverse portion 200.

The portion 200 is reinforced at 202 at its center and a threaded opening 204 receives a threaded shaft 206 attached at its upper end to a knob 220.

The lower end of the shaft 206 is attached to a flat circular disc 224 received in a receiver 230, which latter permits the disc 224 to rotate and the shaft 206 to rotate, but retains the disc from motion toward and away from the housing, the receiver 230 being fixed to a substantially C-shaped brace 240 having a horizontal section 242, which latter is fixed to the upper housing portion 84 by rivets 250. The brace 240 has downwardly extending legs 246 extending downwardly on the right and left sides of the housing portion 84 and serving to support studs 260 around which latter latches 270 can be hooked, there being a right and a left latch, each one being rotatably secured by a rivet 270' at its lower end to the lower housing section 82 so that when the latches 270 have their upper ends 276 received around the studs 260, then the lower housing portion 82 and the upper housing portion 84 are thereby securely held together.

Each latch 270 has a notch in its rearward side for receiving a shank of the respective stud 260 and by simply swinging the latches 270 forward at their upper ends, the releasing of the upper housing portion 84 from the lower housing portion 82 can be achieved.

Figure 7:
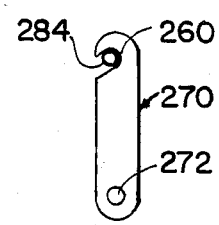
FIG. 7 is a detail showing a latch such as is seen at the central part of FIG. 3, but showing the latch and a catch as they would be seen from the left side of these parts in FIG. 1.

In FIG. 7, a latch 270 is shown with its notch 284 for reception on the stud 260.

Referring to FIG. 4, the rearward end of the housing is supported by a clamp-bracket assembly 300 having a pair of clamp 302 which can be attached one to the left side of the handle-bar 310 of the bicycle and one to the right side thereof, a connector 320 being attached to the clamps 302 and extending forwardly to the underside of the housing and to which latter it is attached at the forward end of the housing by suitable rivets 322.

I claim:

1. An air conditioner for mounting above a ground wheel of a vehicle such as a bicycle and having a frame, an air blowing means, a system wheel, means rotataby mounting said air blowing means and said system wheel on said frame so that said air blowing means is driven by said system wheel, said system wheel being exposed for engagement with said ground wheel, a housing attached to said frame and having an air inlet adjacent said air blowing means and also having an air outlet, said air blowing means being received in said housing whereby air from said blowing means is forced toward said outlet, at least part of said system wheel being outside of said housing, means attachable to such a vehicle for forcing said system wheel against said vehicle wheel, mounting means for mounting said frame on said vehicle and for pressing said system wheel against said ground wheel, said vehicle being a bicycle, said frame being disposable above the forward wheel of said bicycle, said mounting means comprising a pair of arms extendable upwardly from and attachable to the axle of the forward wheel of said bicycle, a top-holding means section interconnecting said arms, a pressing means interconnecting the upper side of said housing and said connecting means in a manner such that when said pressing means is raised with respect to said connecting means said housing will be pressed downwardly for pressing said system wheel drivably with said bicycle wheel.

2. The air conditioner of claim having said air blowing means comprising a pair of blowers disposed one on each side of said system wheel.

3. An air conditioner for mounting above a ground wheel of a vehicle such as a bicycle and having a frame, an air blowing means, a system wheel, means rotatably mounting said air blowing means and said system wheel on said frame so that said air blowing means is driven by said system wheel, said system wheel being exposed for engagement with said ground wheel, a housing attached to said frame and having an air inlet adjacent said air blowing means and also having an air outlet, said air blowing means being received in said housing whereby air from said blowing means is forced toward said outlet, at least part of said system wheel being outside of said housing, means attachable to such a vehicle for forcing said system wheel against said vehicle wheel, mounting means for mounting said frame on said vehicle and for pressing said system wheel against said ground wheel, said air blowing means comprising a pair of blowers disposed one on each side of said system wheel.

4. The air conditioner of claim 3, said housing having a chamber between said blowing means and outlet, said chamber having an ice-insertion opening through said housing and also having an outflow port for water melted from ice, said port being at one side of said housing so as not to drip on said ground wheel, said vehicle being a bicycle.

5. An air conditioner for mounting above a ground wheel of a vehicle such as a bicycle and having a frame, an air blowing means, a system wheel, means rotatably mounting said air blowing means and said system wheel on said frame so that said air blowing means is driven by said system wheel, said system wheel being exposed for engagement with said ground wheel, a housing attached to said frame and having an air inlet adjacent said air blowing means and also having an air outlet, said air blowing means being received in said housing whereby air from said blowing means is forced toward said outlet, at least part of said system wheel being outside of said housing, means attachable to such a vehicle for forcing said system wheel against said vehicle wheel, mounting means for mounting said frame on said vehicle and for pressing said system wheel against said ground wheel, said vehicle being a bicycle, said frame being disposable above the forward wheel of said bicycle, said mounting means being a clamp bracket assembly attachable to the handle-bar of said bicycle and attached to and supporting the rearward end of said housing, said air blowing means comprising at least one air blower on each side of said system wheel, the underside of said system wheel being disposed at a level substantially above the levels of the undersides of said air blowers.

6. The air conditioner of claim 5 in which an air flow direction adjustment means is mounted on said housing at said outlet which can be adjusted for directing air more upwardly or more downwardly by the operator of said bicycle while riding.

7. The air conditioner of claim 3 in which an air flow direction adjustment means is mounted on said housing at said outlet which can be adjusted for directing air more upwardly or more downwardly by the operator of said bicycle while riding.

* * * * *